2,852,343
PROCESS FOR TREATING ALUMINOUS ORES

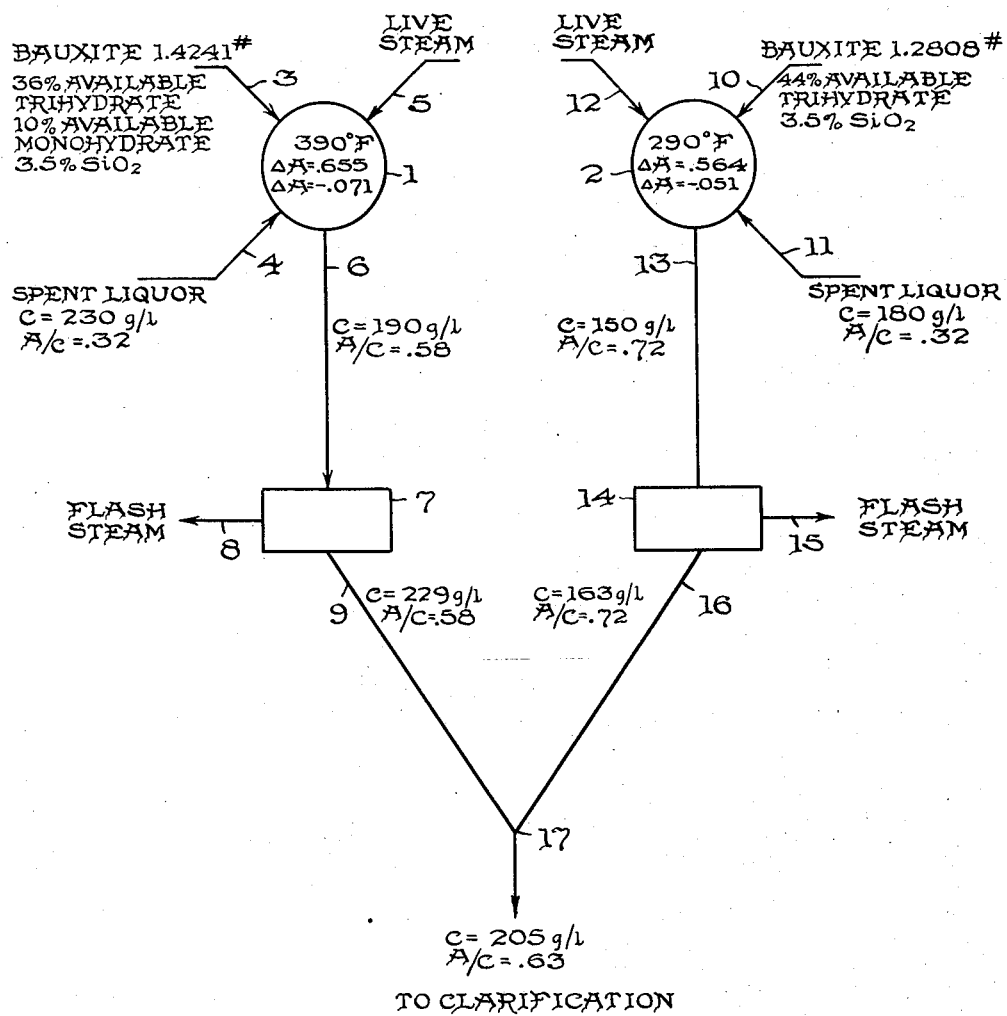

Henry F. Scandrett and John L. Porter, Baton Rouge, La., assignors to Kaiser Aluminum & Chemical Corporation, Oakland, Calif., a corporation of Delaware Application September 30, 1954, Serial No. 459,293

7 Claims. (Cl. 23—143)

The present invention relates to the production of alumina from aluminous ores by the wet alkali aluminate method. More particularly, the invention is directed to a novel process based on the well known Bayer method of extraction of alumina from aluminous ores and is applicable to the recovery of alumina from two or more ores, wherein all of the alumina or a predominant amount thereof is present in the form of alumina trihydrate in at least one of the ores, and wherein at least one of the ores contains at least substantial quantities of alumina in monohydrate form; or from a single aluminous ore wherein the alumina is predominantly in the form of alumina trihydrate but a substantial portion of the total alumina is in the form of monohydrate.

The wet alkali aluminate method, more commonly referred to as the Bayer process, generally involves subjecting the aluminous ore, such as bauxite, to a digestion treatment is spent caustic aluminate liquor under conditions of elevated temperature to extract the available alumina from the ore, producing thereby an enriched caustic aluminate liquor in which the ore residues are suspended. Following this extraction step wherein the alumina values are dissolved in spent caustic aluminate liquors, the green liquors produced thereby have insoluble residues associated therewith and are subjected to clarification operations wherein the aforementioned insolubles are removed. Usually clarification is accomplished by settling and/or filtration operations. Subsequent to clarification, the green caustic aluminate liquors are cooled in most cases and the alumina values recovered therefrom by hydrolysis of the aluminate and precipitation of the alumina. During the precipitation step, the liquor is normally seeded with previously precipitated alumina trihydrate. Generally, the precipitation in a given cycle proceeds to the point where approximately 50% of the dissolved alumina content of the green liquor is recovered as alumina hydrate, the remaining portion of the alumina being retained by the liquor which is then recycled as spent caustic aluminate liquor for further extraction purposes.

The difference in solubility of monohydrate alumina and trihydrate alumina in caustic solutions is the most pronounced reason leading to the utilization of entirely different conditions for processing the two types of ores, namely boehmite which is processed generally in Europe and gibbsite which is generally processed in the Americas, in order to insure the recovery of the maximum amount of available alumina in the respective ores. A lesser reason for the difference in treating methods for these minerals is the physical nature of the ore itself. In the single digestion methods employed in Europe where the rock-like boehmite or monohydrate type of ore is processed, caustic concentrations and temperatures during digestion as high as about 420 grams per liter caustic soda and 390° F. respectively, are employed. (All caustic concentrations reported herein are based on the well known acid titratable method of analysis and are reported as the equivalent sodium carbonate.) Even though European conditions are more drastic than found in the American type Bayer process, the resulting green liquors from which the alumina is recovered contains less alumina per unit of caustic (in other words, a lower green liquor $A/C$ ratio) than found in normal Bayer operations in the American type of process. This is attributed mainly to the difference in solubility in caustic solutions of monohydrate alumina and trihydrate alumina. The high caustic concentrations and temperatures afford practical limitations for efficient and economic operation of the European type process wherein higher $A/C$ ratios of the green liquors are not considered commercially economical in view of the even greater concentrations and temperatures required for the attainment thereof. It is readily apparent to those skilled in the art, that the operating conditions found in the trihydrate or American processes are preferred from an economic as well as an operating standpoint.

The term "charging ratio" as used herein refers to the alumina concentration in the green caustic aluminate liquors as compared to the caustic concentration of said liquors which will be obtained from digesting a given amount of ore in a given spent liquor under given digester operating conditions. These charging ratios are reported herein on a weight basis of $Al_2O_3/NaOH$ wherein the NaOH is the sum of the hydroxide and the aluminate and reported as equivalent $Na_2CO_3$.

"Available alumina" as used herein refers to the quantity of alumina in an ore which may be expected to dissolve in the caustic aluminate liquors during a particular digestion operation. Thus, as is well known, the total alumina content of an ore does not necessarily become solubilized in the caustic aluminate liquor or retained therein after digestion since the refractory aluminas which are not attacked by the caustic solutions do not contribute to the alumina recovered nor does the portion of the normally soluble alumina values which combine with the silica values accompanying the ore to form insoluble silicates contributed thereto. Still further, the available alumina is dependent upon the type of ore digest employed and the type of alumina values found in the ore being treated. Thus, during what may be termed a "monohydrate digest," wherein the conditions are chosen to extract substantially all of the monohydrate alumina in the ore, the available alumina would include the monohydrate alumina as well as such trihydrate alumina as is present in the ore less the alumina which is transformed to insoluble products. In the case where a "trihydrate digest" is employed on an ore containing both monohydrate and trihydrate alumina values, the term "available alumina" would include the trihydrate alumina values less the aforementioned losses. It is to be noted that in the latter case the contained monohydrate alumina when subjected to a trihydrate digest does not contribute to the available alumina. In any event, the term is well known to those skilled in the art and has a definite accepted meaning which is flexibly applicable to the particular digestion conditions employed and the particular aluminous ore employed as a charge thereto.

The benefits of the higher charging ratios which may be utilized in the American process and realized through employment of lower caustic concentrations are reflected in subsequent steps of the process. The lower digester caustic concentrations permit lower caustic concentrations to be economically employed in the precipitation phase than found in conventional European type processes. These lower caustic concentrations and higher alumina to caustic soda ratios in the pregnant or green liquors fed to the autoprecipitation phases combine in effect to give an increased yield in a shorter precipitation period as well as an alumina hydrate product therefrom containing in most cases decreased amounts of fine hydrate as compared to European practice. The fact that a greater yield of precipitated alumina hydrate per unit of time can be realized in the trihydrate type of process as compared to the monohydrate type of process because of the above mentioned factors, is obviously beneficial for equipment economy. On the other hand, a product containing fewer percentages of fine hydrate is also desirable, especially in view of the fact that greater than 1% of the product is normally lost in calcination and subsequent handling of the calcined product, this loss being attributed directly to the fine nature of the product.

If Jamaican laterite is processed for substantially complete extraction of both monohydrate and trihydrate forms of alumina, digestion conditions must be chosen with respect to the extraction of the monohydrate phase. The digester conditions of temperature and caustic concentration must necessarily be high enough during the time of digesting to maintain a sufficient extraction potential with respect to the undissolved monohydrate alumina throughout the length of time of the digest. Otherwise, substantially complete extraction of the monohydrate alumina will not take place. This can be accomplished only by choosing conditions of caustic concentration and temperature which would produce an equilibrium alumina to caustic soda ratio greater than the desired charging ratio. Although it is known that the Jamaican laterites can be processed according to a monohydrate type of digest and charging ratios employed corresponding to European practice at caustic concentrations and/or temperatures less than found in conventional European monohydrate practice because of the finely divided physical nature of the bauxite, higher charging ratios corresponding to American practice may only be uneconomically obtained by conditions unheard of in actual American Bayer plant practice. Consequently, when processing a bauxite with the extraction of both forms of alumina in a single digest system, the lower charging ratios associated with the European practice are again the practical limits. The disadvantages found in the autoprecipitation phase of the Bayer process and which are associated with these lower charging ratios common to Europe will thus become apparent when a single monohydrate digest is performed on a mixed boehmite-gibbsite ore such as found in Jamaica.

On the other hand, a Jamaican type of laterite containing substantial quantities of both forms of alumina may be processed according to conventional American Bayer plant practice for the extraction of the available trihydrate alumina only. In such an operation, the lower caustic concentrations and temperatures common to American processes prove economically attractive as do the higher charging ratios which may be employed and the beneficial precipitation results which flow therefrom. One disadvantage of this method of extraction when applied to mixed hydrated aluminous ores lies in the inability to recover the monohydrate alumina. Consequently, when compared with a method for complete extraction of both monohydrate and trihydrate alumina, greater amounts of bauxites are required per unit of alumina produced. It is obvious that such an extraction process is undesirable where appreciable amounts of the monohydrate form are present in the ore. Not only does this increase the cost of bauxite per unit of product, but soda ash, lime and starch consumption, being a function of the amount of bauxite processed, are also substantially increased.

Another disadvantage of a mere trihydrate alumina process when applied to an ore containing both monohydrate and trihydrate alumina is the tendency of the caustic Bayer solution, which is supersaturated with respect to the monohydrate alumina saturation concentration for the particular trihydrate extraction conditions employed, to precipitate solid monohydrate alumina. Thus, under trihydrate digestion conditions the liquor is unsaturated with respect to trihydrate alumina but supersaturated throughout a substantial period of time of the digest with respect to monohydrate alumina. In effect, trihydrate alumina dissolves, forms sodium aluminates in solutions, then precipitates on the monohydrate crystals as monohydrate alumina and is thereafter removed with the red mud. This phenomenon is sometimes termed "reversion" or "inversion." Where undissolved monohydrate alumina is present, as is the case in the residue of a mixed bauxite from which only the trihydrate alumina has been extracted, the amount of precipitation is increased because of the catalytic or seeding effect of the undissolved monohydrate alumina. Thus, although limited reversion takes place spontaneously in the conventional American trihydrate extraction processes employing such bauxites as of the Surinam type, the loss from reversion is even greater when a Jamaican type of ore is subjected to a trihydrate extraction because of the increased amount of monohydrate seed particles.

Regarding a monohydrate type of extraction system, the amount of alumina which is solubilized in the caustic aluminate spent liquors to form green caustic aluminate liquors is limited according to the practical and economic limitations set by the drastic caustic soda concentrations and temperatures required during the digestion phase and their ultimate effect on subsequent steps in the process. Thus, the $A/C$ ratio obtained in the green liquors is determined to a substantial degree by the caustic soda concentration employed, the concentration in turn being limited by the evaporation costs and economies associated with the obtainment of high temperatures during digestion, as well as the settling problems which accompany highly concentrated caustic solutions. In the trihydrate type of extraction process the practical limitation on the amount of alumina which may be solubilized in the spent caustic aluminate liquors is that amount which the caustic liquors will retain during the clarification operations as normally carried out under atmospheric pressure conditions at about the boiling point of the caustic aluminate solution. Thus, because of the losses of alumina caused by premature precipitation during clarification operations, it is not practical to digest under charging condition which would otherwise permit greater than about an $A/C$ ratio of .65 since higher $A/C$ ratios contribute to excessive losses of alumina during clarification operations caused by premature precipitation thereof. This is readily apparent when the supersaturated nature of the pregnant or green caustic aluminate liquors is considered. Thus, the digestion conditions in either a monohydrate or trihydrate process conform to an equilibrium alumina to caustic ratio for the respective form of alumina hydrate, in excess of the charging ratio. In this manner, the alumina values of the ore are substantially all dissolved to an $A/C$ ratio approaching the equilibrium alumina to caustic ratio for the conditions found during the digestion phase. Thereafter, the digester effluent liquors are subjected to depressurization through flashing whereby the temperature is decreased, as in normal operations, to the atmospheric boiling point. Under the atmospheric boiling conditions, it is apparent to those skilled in the art that a supersaturated solution of caustic aluminate is presented having an alumina content appreciably above the equilibrium alumina content for the particular conditions which prevail therein. In general, a solution of caustic soda can hold greater amounts of alumina as the caustic soda concentration increases as well as when the temperature conditions under which the liquors exist increases. Therefore, through depressurization which causes a decrease in temperature of the solution, if the solution is near the equilibrium concentration of alumina during digestion, after depressurization, the solution will be supersaturated with respect to the solubilized alumina content. This difference in solubilities of alumina under different temperature and caustic conditions forms the basis under which the Bayer process is operated. As such because of the more readily soluble nature of the trihydrate type of bauxite, and the ability to obtain high alumina to caustic soda ratios during digestion, the limiting factor during trihydrate type of extraction processes is the alumina concentration under clarification conditions which the caustic liquor will hold without appreciable losses thereof through premature precipitation. The premature precipitation of alumina during clarification in excessive amounts further catalyzes the precipitation of more alumina hydrate and the metastability of the liquor is interrupted excessively. By premature precipitation is meant precipitation of the alumina from the solution prior to the recovery step in the Bayer type of process which recovery step may be carried out according to the conventional precipitation operation employing previously precipitated alumina trihydrate as seed for the deposition of the alumina content of the green liquor.

Therefore, it may be seen that because of the difference in alumina solubility in the caustic liquors during a Bayer type process, and the fact that during the operation of an efficient plant, only minor amounts of alumina are lost through premature precipitation during the clarification stage, that the condition of the liquor during the clarification stage may be termed "metastable." The green liquor after flash cooling of the digester effluent to the atmospheric boiling point is supersaturated as regards the soluble alumina. This liquor as it passes through the clarification step of both mud settling and filtration is supersaturated but in a state of temporary and precarious stability such that the alumina remains in solution. This state of precarious stability at about 120% of the equilibrium alumina solubility is called a "metastable" condition. This state of apparent stability, as is well known, can be upset by cooling to increase the degree of supersaturation or by the addition of alumina hydrate seed. The state of "metastability" has a fairly narrow range. At lower alumina concentrations or alumina-to-caustic ratios, the liquor is truly stable. At higher alumina concentrations or ratios the liquor is so highly supersaturated that it is unstable and subject to premature autoprecipitation. The operable range of "metastability" is about 120 to 125% of equilibrium solubility, but over about 130% of solubility is up in the range of instability in the presence of mud residues from the bauxite digest and at about 105° C. Consequently, the maximum alumina to caustic ratio which may be tolerated during any one type of Bayer operation must be predetermined considering the above factors as well as the stabilizing effect of any flocculating agents, such as starch, that are employed during the clarification operation and the losses which may be suffered through the seeding effect of any unextracted alumina values.

From the previous description of Bayer process operations, it is apparent that, in processing a mixed alumina containing ore such as found in Jamaica, avoidance of the drastic digestion conditions required for monohydrate extractions and obtainment of the high alumina to caustic soda values in the green liquor such as associated with normal trihydrate extraction processes are the primary desires. Consequently, the maximum $A/C$ ratio during clarification operations, wherein the liquors are metastable with respect to the alumina content, should result from the least drastic extraction conditions as possible in an economical process.

Accordingly, it is an object of the herein described invention to provide a process for the treatment of aluminous ores for the recovery of the alumina content according to a Bayer type process wherein the alumina content is found both in the monohydrate and trihydrate forms. Still further, it is an object of the invention to provide a process for the extraction of the available alumina content of ores containing both monohydrate and trihydrate alumina and the production of a green caustic aluminate liquor having a high $A/C$ ratio such as conventionally found in American Bayer type processes. Another object is to provide a process for the complete extraction of both the monohydrate and trihydrate forms of alumina found in mixtures of monohydrate containing and trihydrate containing ores and the production of a green caustic aluminate liquor having an $A/C$ ratio corresponding to conventional American Bayer practice. Another object is to provide a process for the complete extraction of the available alumina of an aluminous ore containing both monohydrate and trihydrate alumina values wherein digestion conditions are usually appreciably less drastic than those conventionally found in normal monohydrate extraction processes of the single step type. Still further, it is another object of the invention to provide a process for the treatment of mixed monohydrate-trihydrate alumina containing ores for the production of high alumina to caustic soda values in the green liquors while simultaneously extracting the major portion of the available alumina values of the mixed ore under extraction conditions as regards caustic soda concentration substantially less than found in normal one step monohydrate extraction processes. Still another object is to provide a process for the treatment of monohydrate-trihydrate containing bauxites to produce a green liquor from which a product may be obtained during the precipitation phase of the Bayer process having less fine hydrate produced than in conventional monohydrate type of extraction processes. Another object is to provide a process for the treatment of two ores, one of which contains both monohydrate and trihydrate alumina for the extraction of all of the available alumina therefrom, the other ore containing appreciable quantities of monohydrate alumina yet consisting predominantly of trihydrate alumina for the recovery of substantially all of the trihydrate alumina therefrom. Still further, it is an object to provide a process for the treatment of two ores, one of which is a mixed monohydrate-trihydrate aluminous ore wherein the monohydrate content is appreciable and the trihydrate alumina content predominates for the complete extraction thereof, the other ore containing at least predominant amounts of trihydrate alumina for the complete extraction thereof and the production of a green caustic aluminate liquor of high alumina content such as found in American Bayer type practice. Another object is to provide a method of treating two ores for the extraction of the alumina content thereof and the production of a metastable green caustic aluminate liquor during clarification operations. Another object is to provide an extraction process for the alkaline treatment of mixed monohydrate-trihydrate ores for the recovery of the alumina content therein and the production of a metastable liquor of predetermined alumina content during the clarification stage. Another object is to provide an extraction process for the treatment of aluminous ores which may be carried out in a major portion of the equipment now existing in American Bayer type processes.

According to the invention a monohydrate alumina containing bauxite is digested in spent caustic aluminate liquor for the extraction of the monohydrate alumina, and simultaneously a bauxite containing predominantly trihydrate alumina is digested in a separate portion of spent caustic aluminate liquor for the extraction of the trihydrate alumina. Thereafter, the effluents of the two separate digests are blended to obtain a green caustic aluminate liquor which is metastable during the clarification operation. To realize the full benefits of the process, the monohydrate digest should be carried out under conditions productive of an $A/C$ ratio below that obtained in the trihydrate digest so as to enable employment of less drastic digestion conditions with the most difficultly soluble form of alumina, and the trihydrate digest should be carried out under conditions productive of an $A/C$ ratio higher than normally attained in American practice. It will thus be seen that the invention contemplates two separate digestion steps operated in parallel whereafter the effluents are blended to obtain the desired alumina content during clarification operations. Generically, the process is applicable to the solubilization of the alumina content of an all monohydrate containing bauxite or a mixed monohydrate-trihydrate bauxite during a monohydrate type of digest with parallel extraction of the trihydrate alumina of a gibbsite type of ore of an all trihydrate or a mixed monohydrate-trihydrate type of ore. The effluents are blended after the respective digests to produce a green caustic aluminate liquor during clarification which is metastable and of the order of magnitude found in normal trihydrate extraction processes.

According to the process, the monohydrate extraction phase, when treating, for example, a mixed trihydrate and monohydrate containing bauxite of the Jamaican type, is carried out by charging the ore to spent caustic aluminate liquors in amounts sufficient to obtain $A/C$ ratios in the effluent of from about .54 to about .60 and digesting the bauxite in the spent liquor under conditions which provide an extraction potential with respect to undissolved monohydrate alumina throughout the period of digestion to substantially extract all of the available alumina in the bauxite charged thereto. Thus, the invention contemplates complete extraction of the available alumina, which in this case includes both the monohydrate and the trihydrate alumina in the bauxite under conditions of caustic concentration and temperature during digestion which will accomplish this result. Specifically, with Jamaican type laterites containing both monohydrate and trihydrate alumina, it has been found that these $A/C$ ratios in the green caustic aluminate liquor from a digest may be accomplished by employing caustic soda extraction conditions falling within the ranges of caustic concentrations between about 170 and 270 grams per liter under temperature conditions during the digest of between about 385 to 400° F. The length of time for the digest is chosen to accomplish substantially complete solubilization of all of the available alumina as is well known to those skilled in the art. It is preferable from an economic standpoint during the monohydrate digest to charge to ratios between about .54 and .58 in order to obtain the benefit of employing a caustic liquor having a concentration in the lower ranges of those previously given. In this manner lower finishing ratios during autoprecipitation operations are more readily obtained and lower caustic concentrations may be employed during clarification operations, it being well known that increased concentrations of caustic during clarification operations materially affect the rate of settlement of the mud residues. It is preferable to use a high temperature during the digest, for example within the ranges previously given, to accomplish the dissolution of the alumina since the higher temperatures are more economically and readily obtained than are the higher caustic concentrations, increases of either temperature or caustic concentration, however, increases the solubility of alumina in caustic liquors. It is readily apparent to those skilled in the art that a slight increase in temperature during digestion greatly enhances the solubility of the alumina in the caustic liquors; whereas, an increase in concentration is less effective in producing this result.

The ranges of operation as regards the $A/C$ ratio of the green caustic aluminate liquor, the caustic concentration during digestion and the temperatures employed are to be considered merely as the most advantageous and practical operating ranges and are not to be construed as limiting this phase of the operation except insofar as set out in the claims with specific reference to the monohydrate extraction phase of the herein described process. Furthermore, it is apparent that the operating conditions may vary according to the employment of different ores. For example, conditions approaching European conditions may be preferred when a European type boehmite ore is being processed.

Concerning the trihydrate extraction phase of the process when carried out on an ore having predominant amounts of trihydrate alumina therein such as, for example, of the Surinam type, the invention contemplates treating said ore by charging same to a separate portion of spent caustic aluminate liquor in amounts to produce an $A/C$ ratio of between about .68 and .75 in the green caustic liquor therefrom after solubilization of substantially all of the trihydrate alumina therein. Substantial quantities of the contained monohydrate alumina in the trihydrate alumina ore charge are not contemplated as being extracted during this phase when a mixed trihydrate-monohydrate ore is processed in this trihydrate extraction step, and accordingly, the conditions for digestion are such as to maintain a trihydrate extraction potential throughout all of the digest as opposed to maintaining a monohydrate extraction potential throughout the digest. Thus, it is recognized that for a fraction of the digest, conditions may prevail wherein there is a monohydrate extraction potential but that the main object is to maintain a trihydrate extraction potential throughout this digest for the substantially complete recovery of the trihydrate alumina only, the predominant and major portion of the monohydrate alumina not becoming solubilized in the caustic aluminate liquors. In general, it has been found that these $A/C$ ratios heretofore mentioned may be accomplished by conditions not appreciably different from those found in normal American Bayer plant digestion conditions. Thus, for example, it has been found that temperature conditions between about 290 and 300° F. are preferred during the trihydrate extraction with the employment of caustic concentrations between about 140 and 200 grams per liter caustic soda. It may be pointed out at this point that conditions varying from those herein given during the digest may be employed, but that for a practical operation employing existing equipment in American trihydrate type of Bayer plants, the ranges of operation herein given are based on economic processing of the bauxites wherein the advantages to be derived are obtainment of high $A/C$ ratios in subsequent precipitation operations and the employment of a reasonable proportion of ore for the complete recovery of all the available alumina when accounting for the losses which may be tolerated as a result of the nonextraction of such monohydrate alumina as may exist during the trihydrate extraction phase of the process.

As an essential step in the process it is necessary to combine the effluents from the two digests, heretofore more particularly pointed out, in proportions such that a predetermined alumina to caustic ratio will result in the blend which is, in the preferred form, within the metastable range which can be tolerated during clarification operations. Thus, as has been previously indicated, ratios above the metastable range during clarification operations merely facilitate the loss of alumina and detract from the advantages of the process.

Preferably it is desired to blend the effluents of the respective digests to obtain an alumina to caustic soda ratio of between about .62 and .65 during the clarification operation when the monohydrate digest is carried out to obtain $A/C$ ratios between about .54 to .60 and the trihydrate digest is carried out to obtain an $A/C$ ratio between about .70 to .75. The caustic concentrations required with the temperature ranges previously given for obtaining these latter alumina to caustic soda ratios from the respective digests facilitate economic operation of the clarification step for the process under the hereinbefore indicated $A/C$ ratios without appreciable losses through premature autoprecipitation. In other words, it has been found that alumina to caustic ratios between about .62 and .65 are within the metastable range for clarification operations as would normally be carried out in this parallel type of extraction process.

As a specific example of the herein described process, reference is made to the drawing which shows schematically the digestion of a monohydrate containing bauxite with parallel extraction of the alumina content of a trihydrate containing bauxite and the blending of the effluents thereof prior to clarification. For the specific example a Jamaican type bauxite having both monohydrate alumina and trihydrate alumina contents equivalent to 46% available alumina and a 3.5% silica content was employed. For the trihydrate digest a bauxite having 44% available alumina and 3.5% silica was employed in a parallel extraction of the trihydrate alumina content therefrom.

With particular reference to the drawing, therein depicted is a monohydrate digestion system 1 and a trihydrate digestion system 2. 1.424 pounds of dry bauxite having the indicated available trihydrate and monohydrate alumina contents as well as the indicated silica content is fed to the monohydrate digestion system 1 as for example at 3; whereas, spent liquor is fed to the digestion system as at 4, said spent liquor having previously been concentrated to a caustic concentration of 230 grams per liter and having an $A/C$ ratio of .32. Live steam may be inserted to the monohydrate digestion system 1 as at 5 to maintain a temperature of about 390° F. throughout the monohydrate extraction phase. During the monohydrate extraction phase which is carried out in monohydrate digestion system 1 a monohydrate extraction potential is maintained throughout the digest with the result that .655 lb. of alumina are solubilized in the spent liquor and .071 lb. of caustic are lost mostly as insoluble sodium aluminum silicate complexes. The effluent 6 from the monohydrate digestion system has a caustic concentration of 190 grams per liter and the green liquor has an $A/C$ ratio of .58. It may be stated at this point that since the final caustic concentration during monohydrate digestion as well as any digest is determinative of the maximum solubility of alumina in the caustic liquors, that where digestion conditions are indicated herein as having a specific caustic concentration, reference is made therefore to the effluent caustic conditions. This is apparent to those skilled in the art. The effluent from the monohydrate digestion system 6 may then be led as in this example to flask tanks 7 wherein the green caustic aluminate liquors are flashed to atmospheric boiling temperatures and the steam is removed therefrom as at 8. As a consequence of the depressurization during the flashing phase carried out in flask tank 7 the caustic concentration is increased to 229 grams per liter in this specific example and the $A/C$ ratio remains at approximately .58 as indicated at 9 depicting the effluent from the flash tanks.

1.281 lbs. of bauxite having the indicated available trihydrate alumina content and silica content is fed to trihydrate digestion system 2 as at 10. Spent liquor is fed to the trihydrate digestion system as at 11, the spent liquor having previously been conditioned to a caustic concentration of 180 grams per liter and having an $A/C$ ratio of .32. Live steam is inserted as at 12 to maintain a temperature of about 290° F. during the trihydrate digest. As a result of the digest .564 lb. of alumina are added to the dissolved content of the spent liquor and .051 lb. of caustic are lost through the formation of insoluble compounds. The effluent from the trihydrate digestion system has a caustic concentration of 150 grams per liter and an $A/C$ ratio of .72 as indicated at 13. The trihydrate digestion system effluent 13 is led to flash tanks 14 wherein through depressurization steam 15 is removed therefrom causing an increase in the concentration of caustic to 163 grams per liter as indicated at 16 in the effluent from the flash tank system. Thereafter the effluent 9 from the flash tank system 7 of the monohydrate side of the process and the effluent 16 from the flash tank system of the trihydrate side of the process are combined as at 17 to produce a green caustic aluminate liquor having a caustic concentration of 205 grams per liter and an $A/C$ ratio of .63 which then may be subjected to clarification operations.

For the specific system depicted in the drawing depressurization of the monohydrate and the trihydrate digestion systems in flash tanks 7 and 14 respectively are accomplished prior to the blending of the effluents as at 17. As is apparent to those skilled in the art the particular means employed for flashing and the particular point in the process wherein the flashing is accomplished prior to clarification is a matter which depends upon the desired availability of high temperature steam for heat transfer purposes. Thus, the inventive concept is not limited to any particular flashing system or to any particular point during the process prior to clarification wherein the flashing is carried out. For example, it is within the concept of the invention to blend the effluents from the monohydrate digestion system and the trihydrate digestion system prior to flashing or during any stage thereof. Where flashing of the trihydrate digestion system is carried out prior to the blending at atmospheric pressure conditions, blending should be accomplished immediately after the flash to prevent spontaneous precipitation because of the exceedingly high alumina concentrations in the trihydrate extraction liquors.

The alumina values as herein presented are determined by neutralization and formation of alumina trihydrate whereafter the insoluble product is calcined as is customary in the industry.

It is apparent from the description heretofore given that the process basically involves a parallel extraction with subsequent blending of the effluents from said extractions. Where only one bauxite having a predominant amount of trihydrate alumina yet also containing substantial portions of monohydrate alumina is available for processing, one portion of the bauxite may be subjected to the monohydrate digest for the recovery of the available alumina thereof which includes both the monohydrate and trihydrate alumina, and a separate portion of the ore may be employed under trihydrate digestion conditions for the extraction of the trihydrate alumina only. The monohydrate extraction phase under such conditions would be directed to the complete solubilization of both the monohydrate and trihydrate alumina and the obtainment of an $A/C$ ratio in the green caustic aluminate liquors for said digest of between about .54 and .60; whereas, the trihydrate digest would be directed to the obtainment of an $A/C$ ratio in the green caustic aluminate liquor of between about .68 and .75. It is apparent that with changes in the composition of the bauxite that the quantities of bauxite allocated to the respective digests will change to accomplish the most economical result. Accordingly, the invention is to be considered generic in contemplating the proportions of ore subjected to the respective digest. Still further, it is likewise apparent to those skilled in the art that the invention in view of the prior disclosure herein given is applicable to a monohydrate containing bauxite regardless of the amount of trihydrate alumina contained therein when said ore is subjected to the monohydrate digest. Thus, the boehmite ores of Europe might be employed for the source of alumina in the monohydrate digest. On the other hand, the trihydrate digestion phase is limited to employing a bauxite having a predominant amount of trihydrate alumina. In the trihydrate extraction phase a bauxite having appreciable quantities of monohydrate alumina may be tolerated at the expense of not extracting the monohydrate alumina although in the preferred form during the trihydrate digest, a Surinam type ore is preferred, that is a bauxite having the available alumina present mostly in the trihydrate alumina form.

From the foregoing, the generic nature of the invention is apparent and accordingly, the claims are not to be construed as limited except insofar as herein presented.

What is claimed is:

1. In a continuous Bayer type process for the recovery of alumina values from its ores which includes digestion and clarification steps, the method of treating an ore containing its alumina values at least predominantly as trihydrate alumina and an ore containing at least a portion of its alumina values as monohydrate alumina to produce a green caustic aluminate liquor having an alumina-to-caustic ratio between about .62 and .65 during said clarification step, comprising charging said monohydrate alumina containing ore to spent caustic aluminate liquor in an amount sufficient to produce a ratio of $A/C$ between about .54 and .60 when substantially all of the available alumina of said ore is dissolved therein and digesting said ore therein to dissolve substantially all of said available alumina under temperature conditions between about 385 and 400° F. and caustic soda concentration conditions between about 170 and 270 grams per liter, separately charging said trihydrate alumina containing ore to a separate portion of spent caustic aluminate liquor in an amount sufficient to produce a ratio of $A/C$ between about .68 and .75 when substantially all of the available trihydrate alumina of said ore is dissolved therein and digesting said ore therein to dissolve substantially all of said available trihydrate alumina under temperature conditions between about 290 to 300° F. and caustic soda conditions between about 140 and 200 grams per liter, and blending the effluent of said monohydrate alumina ore digest with the effluent of said trihydrate alumina ore digest in proportions to obtain the said first-mentioned $A/C$ ratio prior to the clarification step.

2. In a continuous Bayer type process for the recovery of alumina values from its ores which includes digestion and clarification steps, the method of treating an ore containing its alumina values predominantly as trihydrate alumina and containing appreciable quantities of monohydrate alumina to produce a green caustic aluminate liquor having an alumina-to-caustic soda ratio of from about .62 and .65 during said clarification step, comprising charging one portion of said ore to spent caustic aluminate liquor in an amount sufficient to produce a ratio of $A/C$ between about .54 and .60 when substantially all of the available alumina of said ore is dissolved therein and digesting said ore therein to dissolve substantially all of said available alumina under temperature conditions between about 385 and 400° F. and caustic soda conditions between about 170 and 275 grams per liter, separately charging a second portion of said ore to a separate portion of spent caustic aluminate liquor in an amount sufficient to produce a ratio of $A/C$ between about .70 and .75 when substantially all of the available trihydrate alumina of said ore is dissolved therein and digesting said ore therein to dissolve substantially all of said available trihydrate alumina under temperature conditions between about 290 and 300° F. and caustic soda conditions between about 140 and 200 grams per liter, and blending the effluents of said digestion of separate portions of said ore in proportions to obtain the first-mentioned $A/C$ ratio prior to said clarification step.

3. In a wet caustic aluminate process for the production of alumina from its ores wherein the ore is digested in caustic aluminate liquor, the ore residue is removed from the supersaturated caustic aluminate liquor by clarification, alumina is precipitated from the liquor, and the spent caustic aluminate liquor is recycled to the digestion phase, the improved method of extracting alumina from ores containing caustic soluble monohydrate and trihydrate alumina to increase the yield of alumina per unit of recycled caustic aluminate liquor, while obtaining a supersaturated caustic aluminate liquor having an alumina-to-caustic soda ratio of from about .62 to about .65 for clarification and precipitation and which is stable against premature precipitation of alumina during clarification, comprising the steps of charging a monohydrate alumina-containing ore to a portion of the spent liquor having a caustic soda concentration and temperature providing a monohydrate extraction potential to substantially completely extract the alumina of the ore charge and to produce an alumina-to-caustic soda ratio in the liquor intermediate that of the spent liquor and the ratio during clarification, digesting a charge of ore, the alumina content of which is at least predominantly trihydrate, in a separate portion of spent caustic aluminate liquor having a caustic soda concentration and temperature providing a trihydrate alumina extraction potential only to substantially completely extract the trihydrate alumina content of the second-mentioned ore charge and to produce an alumina-to-caustic soda ratio in the separate liquor portion substantially exceeding said first-mentioned ratio at which the liquor is stable during clarification, and thereafter prior to clarification blending the liquors from the two digestion steps to obtain said supersaturated caustic aluminate liquor having said first-mentioned alumina-to-caustic soda ratio.

4. A process according to claim 3 in which the liquor effluent from the monohydrate digestion has an alumina-to-caustic soda ratio of from about .54 to about .60, and the liquor effluent from the trihydrate digestion has an alumina-to-caustic ratio of from .68 to about .75.

5. A process according to claim 3 in which the monohydrate alumina-containing ore charge is digested in caustic aluminate liquor having a caustic soda concentration of from about 170 to 270 g./l. and a temperature of from about 385 to 400° F., and the predominantly trihydrate alumina-containing ore is digested in caustic soda aluminate liquor having a caustic concentration of from about 140 to 200 g./l. and a temperature from about 290 to 300° F.

6. In a continuous wet caustic aluminate process for the recovery of alumina from its ores wherein the ore is digested in spent caustic aluminate liquor, the ore insolubles are removed from the supersaturated caustic aluminate liquor by clarification, alumina is precipitated from the liquor, and the spent liquor is recycled to the digestion phase, the improved method of extracting alumina from ores containing both caustic soluble monohydrate and trihydrate alumina comprising the steps of digesting a predominantly trihydrate alumina-containing ore having a relatively high monohydrate alumina content in one portion of the spent caustic alumina liquor having a caustic soda concentration and temperature providing a monohydrate extraction potential for the total ore charge, said charge being limited to obtain substantially complete extraction of the alumina content and to produce an alumina-to-caustic soda ratio in the liquor not exceeding about .60, digesting a predominantly trihydrate alumina-containing ore having a relatively low monohydrate alumina content in a separate portion of the spent caustic aluminate liquor having a caustic soda concentration and temperature providing a trihydrate extraction potential only to substantially completely extract the trihydrate alumina content and to produce a supersaturated caustic aluminate liquor unstable with respect to clarification at the atmospheric boiling point of the liquor and having an alumina-to-caustic soda concentration of at least about .68, and blending the liquors from the two digestion steps prior to clarification to obtain an alumina-to-caustic soda ratio of from about .62 to .65, such that the liquor is metastable during clarification, whereby the yield of alumina per unit of extraction liquor is increased without loss of alumina by premature precipitation during clarification.

7. A process according to claim 6 in which the alumina-to-caustic soda ratio of the liquor from the first-mentioned digestion is from about .54 to .60, and the alumina-to-caustic ratio of the liquor from the second-mentioned digestion is from about .68 to about .75.

References Cited in the file of this patent
UNITED STATES PATENTS 2,701,752    Porter _____ Feb. 8, 1955

OTHER REFERENCES

Transactions AIME, vol. 188, April 1950, Journal of Metals, "Extractive Metallurgy of Aluminum," by R. S. Sherwin, pages 661–667.

UNITED STATES PATENT OFFICE
CERTIFICATE OF CORRECTION

Patent No. 2,852,343                     September 16, 1958

Henry F. Scandrett et al.

It is hereby certified that error appears in the printed specification of the above numbered patent requiring correction and that the said Letters Patent should read as corrected below.

Column 9, line 16, after "In" insert -- other --; lines 64 and 68, for "flask" read -- flash --.

Signed and sealed this 4th day of April 1961.

(SEAL)
Attest:    ERNEST W. SWIDER
Attesting Officer

ARTHUR W. CROCKER
Acting Commissioner of Patents